United States Patent
Huang

[11] Patent Number: 6,116,476
[45] Date of Patent: Sep. 12, 2000

[54] PUSH-BUTTON TYPE BOTTLE HEAD

[76] Inventor: Frank Teh-Hsiung Huang, Suite 804, No. 128, Sec. 3, Ming-Sheng E. Rd., Taipei, Taiwan

[21] Appl. No.: 09/498,061
[22] Filed: Feb. 4, 2000
[51] Int. Cl.[7] .................................................. B65D 47/20
[52] U.S. Cl. ............................................ 222/506; 222/545
[58] Field of Search ..................................... 222/506, 508, 222/517, 545

[56] References Cited

U.S. PATENT DOCUMENTS

| | | | |
|---|---|---|---|
| 1,879,205 | 9/1932 | Gunn | 222/506 |
| 2,530,092 | 11/1950 | Smye | 222/506 |
| 5,944,235 | 8/1999 | Won | 222/545 |

*Primary Examiner*—Philippe Derakshani
*Attorney, Agent, or Firm*—Bacon & Thomas, PLLC

[57] ABSTRACT

A push-button type bottle head to be disposed on a bottle body can make it easier for pouring water out of the bottle body and for preventing water leakage. The push-button type bottle head mainly comprises a bottle head set on the bottle body and a bottle cap set on the bottle head. After the bottle cap is opened and when an external force is applied to an active element, a driven element will be pushed to drive a passive element to enter an "open state" for pouring inside water out; and when the external force is removed, a second elastic element will restore the active element to its original position and the driven element as well as the passive element back to a "close state."

9 Claims, 3 Drawing Sheets

PUSH-BUTTON TYPE BOTTLE HEAD

BACKGROUND OF THE INVENTION

This invention relates to a structure of bottle head, particularly to a leakage-proof push-button type bottle head for easy water supply.

An average thermos bottle usually contains a bottle body and a cap. A user has to open the cap at first, then turn to loosen a bottle muzzle engaged with a threaded neck for pouring out the water in the bottle.

In turning to loosen the bottle muzzle, the user can hardly control the bottle muzzle to be loosened at a proper position so that the pouring rate is different every time to possibly get the user scalded with hot water. Another defect of such a design is that the water inside may flow out in a fall of the thermos bottle if the threaded neck and the bottle muzzle have not been screw-jointed tightly enough.

SUMMARY OF THE INVENTION

The primary object of this invention is to provide push-button type bottle head that the water inside can be poured out easily and the flow rate can be properly controlled.

Another object of this invention is to dispose in the bottle head a first elastic element with greater elastic force than that of a second elastic element so that the first elastic element will press upwards against a passive element to enable a gasket on a pan-like portion to attach closely to a bottom fringe of a water outlet for prevention of water leakage.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
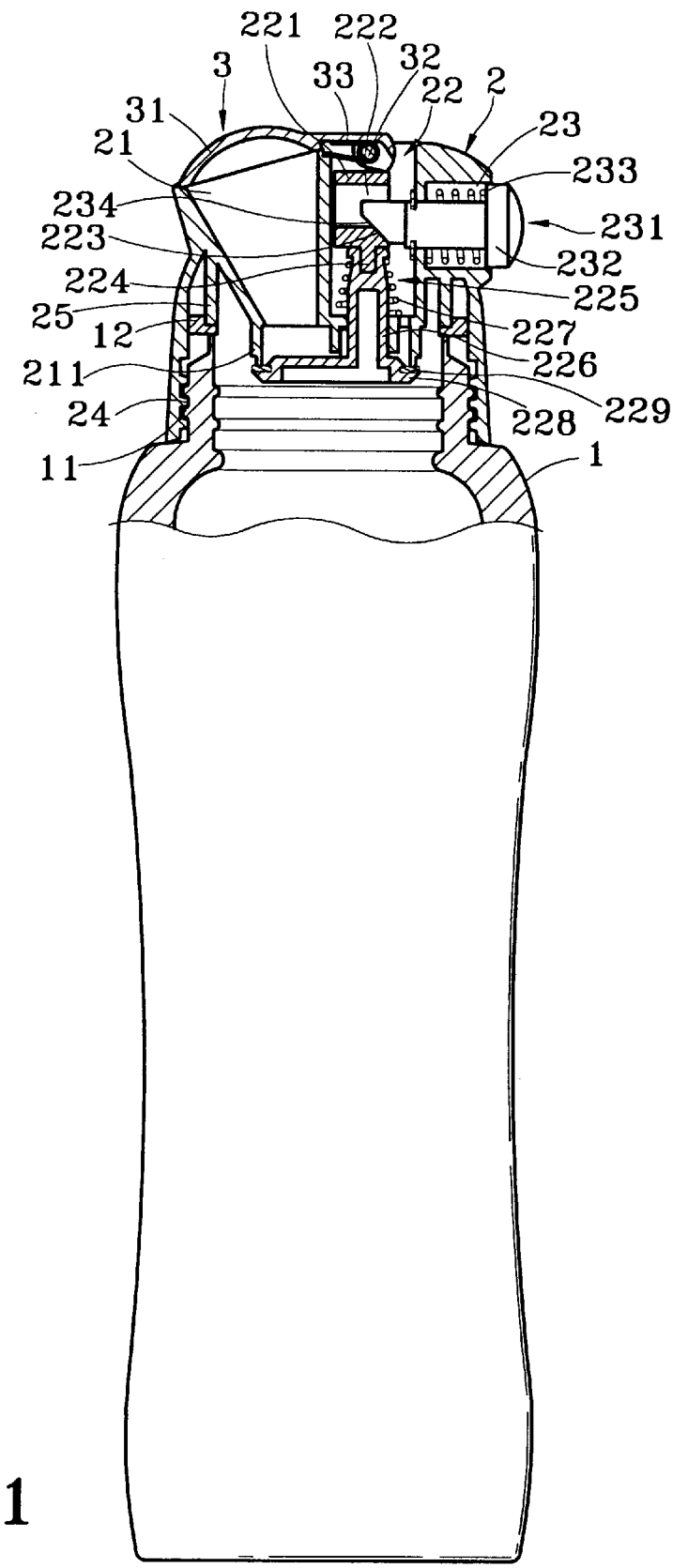
FIG. 1 is a schematic view of an embodiment of this invention.

As shown in FIG. 1, a push-button type bottle head of this invention loaded onto a bottle body 1 to allow easy pouring of inside water and prevent water from leaking comprises a bottle head 2 and a bottle cap 3.

The bottle head 2 disposed on the bottle body 1 is provided inside with a water outlet 21, which is adjacent to a first and a second mutually communicable storage chamber 22, 23, wherein a driven element 221 is arranged in the first storage chamber 22 while a through hole 222 is formed in the driven element 221; a slant bearing face 223 is arranged near the perimeter of the through hole 222. The driven element 221 is extended laterally to form a fix-and-joint portion 224 coupled with a passive element 225, which contains a guide rod 226. A first elastic element 227 is disposed between the guide rod 226 and the first storage chamber 22, wherein a pan-like portion 228 is disposed at one end of the guide rod 226, and a gasket 229 placed on the pan-like portion 228 is used to press against a bottom fringe 211 of the water outlet 21 exactly when the pan-like portion 228 is inactive. Moreover, the second storage chamber 23 is provided with an active element 231 extended to the first storage chamber 22, wherein a second elastic element 233 is located between a flange 232 of the active element 231 and the second storage chamber 23; the front end of the active element 231 is a slant driving face 234 standing in a conflict state against the bearing face 223. Furthermore, a confinement portion 235 is formed at a proper position of the active element 231 to prevent it from loosening and escaping. A threaded portion 24 formed on the inner surface of the bottle head 2 is screw-jointed with another threaded portion 11 located at the outer rim of the bottle body 1, and a stop-and-hold portion 25 is resided in the bottle head 2 for resisting against a stopper 12.

The bottle cap 3 having a sealing portion 31 for sealing the water outlet 21 is pivotally disposed on the bottle head 2, wherein the sealing portion 31 is extended to form a shaft-connecting portion 32 whereon a third elastic element 33 is located. By applying and assembling abovesaid elements or components, a bottle muzzle is completed and resided on the bottle head 1.

Figure 2:
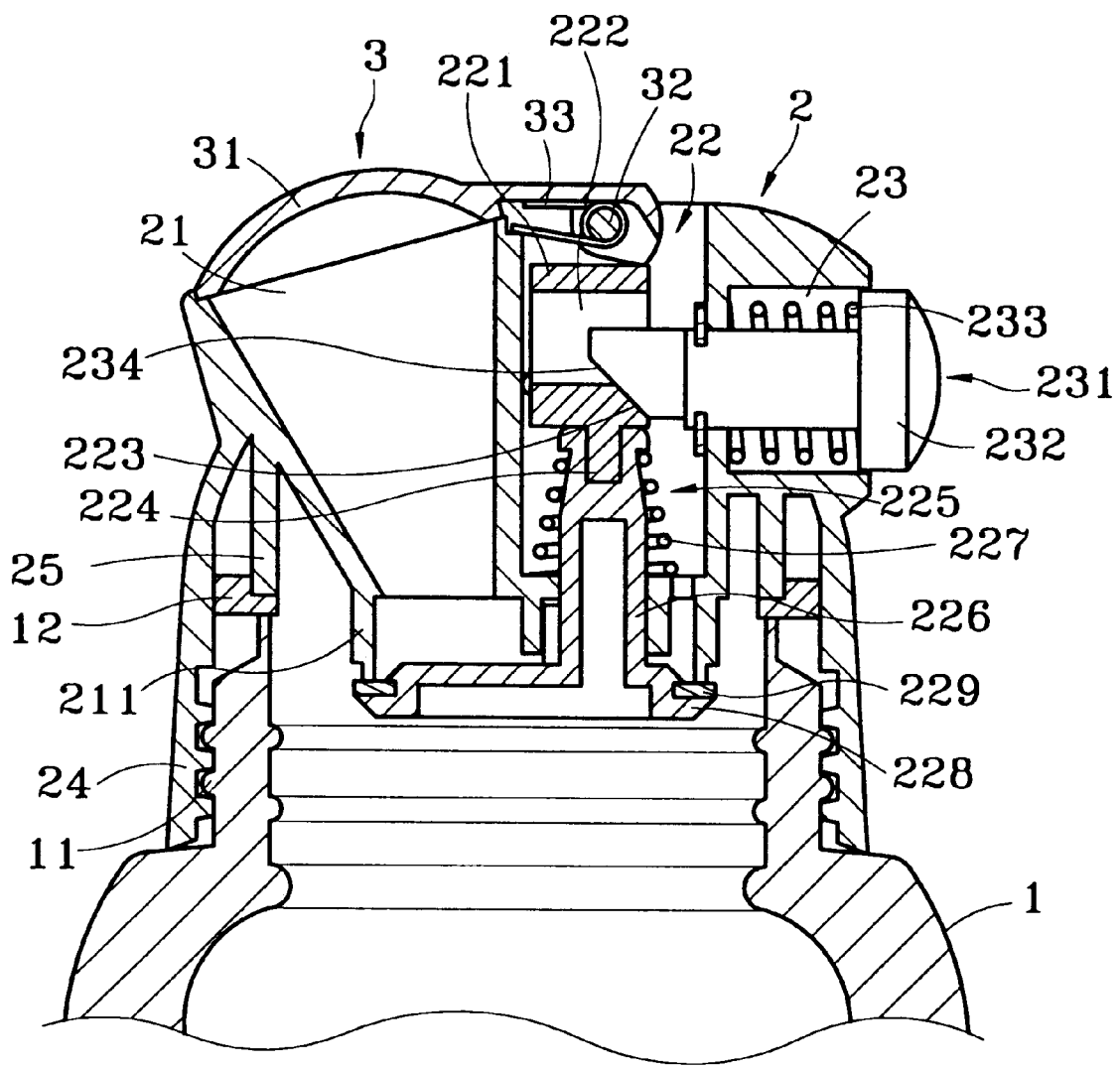
FIG. 2 is a partially enlarged view of FIG. 1.
Figure 3:
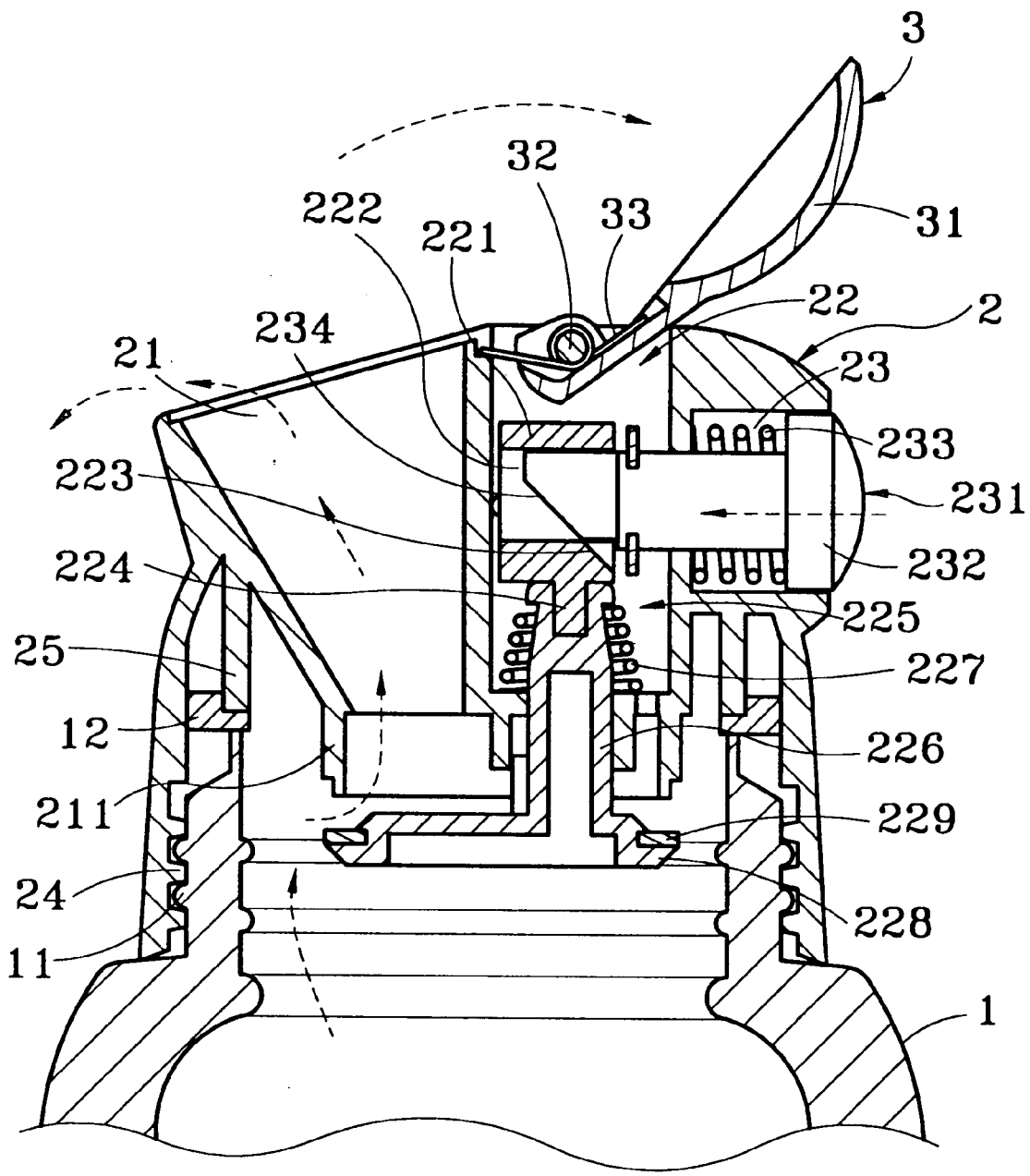
FIG. 3 is an action diagram of FIG. 2.

As FIG. 2 and FIG. 3 indicate, after the bottle cap 3 on the bottle head 2 is opened, a user is supposed to apply force on the driving face 234 at the front end of the active element 231 to thereby drive the bearing face 223 of the driven element 221, namely, to press the driven element 221 downwards that will in turn drive the passive element 225, and at this moment, the pan-like portion 228 of the passive element 225 will depart from the bottom fringe 211 of the water outlet 21 to show an "open state" that allows the user to pour water out of the bottle body 1.

When the force is removed from the active element 231, the first elastic element 227 will push the driven element 221 upwards so that the passive element 225 is driven upwards too and the bearing face 223 of the driven element 221 is supposed to push the active element 231 back to its original position, and meanwhile, the pan-like portion 228 will press against the bottom fringe 211 of the water outlet to enter a sealed state again.

For the reason the elastic force of the first elastic element 227 is greater than that of the second elastic element 233, therefore, when the first elastic element 227 pushes the passive element 225 upwards, the gasket 229 of the pan-like portion 228 can attach intimately to the bottom fringe 211 of the water outlet 21 to thereby prevent water leakage of the bottle body 1.

Further, the water flow rate from the water outlet 21 may be controlled by adjusting the force applied on the active element 231 to thus change size of the open gap between the pan-like portion 228 and the bottom fringe 211 of the water outlet 21 so that an overflow or a scald is avoidable.

In the above described, at least one preferred embodiment has been elucidated with reference to drawings annexed, it is apparent that numerous variations or modifications may be made without departing from the true spirit and scope thereof, as set forth in the following claims.

What is claimed is:

1. A push-button type bottle head to be loaded onto a bottle body to allow easy pouring of inside water and prevent water from leaking, comprising:

a bottle head disposed on said bottle body, wherein said bottle head is provided inside with a water outlet, which is adjacent to a first and a second mutually communicable storage chamber; a driven element is arranged in said first storage chamber while a through hole is formed in said driven element; a slant bearing face is arranged near a perimeter of said through hole, and said driven element is extended laterally to form a fix-and-joint portion coupled with a passive element; moreover, said second storage chamber is provided with an active element extended to said first storage chamber, wherein a second elastic element is located between a flange of said active element and said second storage chamber, and a front end of said active element is a slant driving face standing in a conflict state against said bearing face; and a bottle cap having a sealing portion, which is extended to form a shaft-connecting portion, whereon a third elastic element is located;

by abovesaid architecture, said active element being supposed to push said driven element downwards to drive said passive element to become open for a user to pour water out of said bottle body when said active element is pressed by an external force; on the contrary, said second elastic element being able to restore said active element to its original position and said driven element and said passive element back to a "close state" when the external force is removed.

2. The push-button type bottle head of claim 1, wherein a threaded portion is formed on an outer surface around a bottle mouth of said bottle body.

3. The push-button type bottle head of claim 1, wherein a stopper is arranged on a bottle mouth of said bottle body.

4. The push-button type bottle head of claim 1, wherein both said bearing face and said driving face are made slant.

5. The push-button type bottle head of claim 1, wherein said passive element contains a guide rod; a first elastic element is disposed between said guide rod and said first storage chamber; a pan-like portion is disposed at one end of said guide rod, and a gasket placed on said pan-like portion is used to press against a bottom fringe of said water outlet exactly when the pan-like portion is inactive.

6. The push-button type bottle head of claim 1, wherein a gasket is disposed on said pan-like portion.

7. The push-button type bottle head of claim 1, wherein a confinement portion is provided to said active element.

8. The push-button type bottle head of claim 1, wherein a threaded portion is formed in said bottle head.

9. The push-button type bottle head of claim 1, wherein a stop-and-hold portion is resided in said bottle head for resisting against a stopper.

* * * * *